United States Patent [19]

Miyamoto et al.

[11] 4,045,338
[45] Aug. 30, 1977

[54] METHOD OF REMOVING SCALE-FORMING SUBSTANCES FROM HOT WATER SYSTEM

[75] Inventors: Haruo Miyamoto; Tokuhisa Miyamatsu, both of Nagoya; Seiichi Shirakawa; Hidetoshi Takamoku, both of Nagasaki, all of Japan

[73] Assignees: Mitsubishi Rayon Co., Ltd.; Mitsubishi Heavy Industries, Ltd., both of Tokyo, Japan

[21] Appl. No.: 701,732

[22] Filed: June 30, 1976

Related U.S. Application Data

[63] Continuation-in-part of Ser. No. 474,148, May 28, 1974, abandoned.

[30] Foreign Application Priority Data

May 29, 1973 Japan .............................. 48-59365

[51] Int. Cl.² ........................................... B01D 15/04
[52] U.S. Cl. .................................. 210/36; 210/38 A; 210/40
[58] Field of Search ..................... 55/36; 210/36, 491, 210/492, 496, 502, 510, 38 A, 40; 252/421

[56] References Cited

U.S. PATENT DOCUMENTS

| 2,681,846 | 6/1954 | Guthrie et al. ............... 210/502 X |
| 2,798,850 | 7/1957 | Voigtman et al. ................ 210/502 |
| 3,165,473 | 1/1965 | Pall et al. ..................... 210/496 X |
| 3,252,270 | 5/1966 | Pall et al. ..................... 210/502 X |
| 3,276,188 | 10/1966 | Carlson ............................ 55/39 X |
| 3,327,859 | 6/1967 | Pall ............................. 210/502 X |
| 3,702,832 | 11/1972 | Ermolenko et al. ............. 252/421 |

*Primary Examiner*—Thomas G. Wyse
*Assistant Examiner*—Robert H. Spitzer
*Attorney, Agent, or Firm*—Wenderoth, Lind & Ponack

[57] ABSTRACT

The invention is a filter which comprises a porous support covered by carbonaceous fibers having a carbon content of at least 85%, wherein the individual fibers have a length in the range of from 0.1 to 5 mm and a diameter in the range of from 1 to 50 $\mu$ and acidic groups in a concentration of at least 0.01 meq/g on their surface. The filter is particularly useful for removing substances from water in a supply system for a steam generator.

9 Claims, 5 Drawing Figures

METHOD OF REMOVING SCALE-FORMING SUBSTANCES FROM HOT WATER SYSTEM

CROSS-REFERENCE TO RELATED APPLICATION

This is a continuation-in-part of application Ser. No. 474,148, filed May 28, 1974, now abandoned.

FIELD OF THE INVENTION

The present invention relates to a filter which can be used for removing scale-forming substances from hot water in, for example, steam generators. More particularly, the invention relates to a filter for use in removing scale-forming substances consisting mainly of iron from water for steam generators.

DESCRIPTION OF THE PRIOR ART

Heretofore, water for use in a steam generator operating at a high-temperature, high-pressure and high-heat load has been freed of impurities and/or subjected to ion exchange at a temperature in the vicinity of room temperature. Therefore, the amounts of hard components and silica in scale have been low and the main component of scale, other than very small amounts of metals introduced in the supplied water, has been matter which enters the system subsequent to the water-treating apparatus, for example, matter which is eluted in water from the condensate, water supply and steam drain systems and deposited on an evaporation member. This eluted matter is present in molecular, colloidal and suspended (dispersed phase larger in size than colloid) states of hydroxide or oxide of iron, copper and nickel in the condensate and the supplied water. As the technical and economic problems caused by scale in a steam generator are large, an ion exchange apparatus and a pre-coating (laminating) filter using a floc of cellulose of the pulp series have been provided besides said supplies water treating apparatus at the exit of a condenser in the recovery pipe of a steam drain used in a plant or at the collecting point of the two. However, the ion exchange apparatus and filter can be provided only in zones where the temperature does not exceed 90° C. Consequently, metal oxides and hydroxides eluted from systems subsequent to such zones reach the steam generator without being treated. Deposition of scale then occurs, bringing about obstruction of heat transmission and eventually over-heating of an evaporation pipe. Therefore, at an appropriate time, the steam generator is washed with chemicals to remove scale. However, the chemical washing is expensive and requires that the steam generator be closed down and the waste washing liquid treated.

In Japan, there are already known and used filter materials and ion exchange resins having acidic groups. However, very few of them will withstand the effects of hot water at a temperature of at least 150° C for hundreds or thousands of hours. Active carbon is a material which may withstand the effects of the hot water and which therefore may be used on a porous support. However, active carbon has a drawback in that it is not very satisfactory for pre-coating for use as a filter, even though pre-coating can be done. Furthermore, powdered active carbon sinks into the porous support, thereby increasing the pressure difference across the filter, but if active carbon of larger particle size is used, the percentage of the scale-forming substances removed is lowered. Furthermore, this method requires the use of an anion exchange powdered resin and a cation exchange powdered resin in admixture, namely, by cohesion brought about between the two resins, when the two resins are made a pre-coatable aggregation. Separation and reclamation of the resins are impossible and this method has the drawback of being very expensive. Use of either one of the cation or anion alone results in the material removed by the filter being in too finely dispersed a state (not forming floc). A bad effect therefore results in that the mesh of the support becomes filled and the filling density becomes too high, making the pressure difference across the filter extremely high, and so it is not possible to use either a cationic or anionic exchange resin singly.

SUMMARY OF THE INVENTION

According to the present invention, there is provided a filter which comprises a porous support covered by carbonaceous fibers having a carbon content of at least 85%, wherein the individual fibers have a length in the range of from 0.1 to 5 mm and a diameter in the range of from 1 to 50 $\mu$ and acidic groups in a concentration of at least 0.01 meq/g on their surface.

The filter can be used in high temperature zones in a steam generator to remove materials present in the water which would otherwise be deposited as scale. Thus, the filter suffers little or no damage even when used in water at temperatures up to 200° C. It can be used for a considerable period of time and its effectiveness can be restored by washing with water or with acid. This is similar to the regeneration of an ion exchange resin in that it can be used repeatedly.

A filter of the present invention includes a carbonaceous fiber sintered at a high temperature, having a very strong cross-linkage centering around the graphite structure and because of this, there is almost no apprehension of change of the shape or decomposition upon being used. The fiber used in the filter of the invention is a carbon fiber or graphite fiber which can be obtained by carbonizing by a known method, cellulose fibers, polyvinyl alcohol fibers, polyacrylonitrile fibers, lignin fibers, pitch fibers, furfuryl alcohol fibers or fibers of a special heat-resistant organic high molecular weight substance such as a novolak resin. These fibers are obtained by heating the material fibers normally in the presence of oxygen, thereafter carbonizing the material fibers in an inert gas such as argon or nitrogen. As the carbonizing proceeds, the carbon content increases and the fibers take up a graphite structure and their chemical resistance and resistance to hot water increases. As the filter material of the invention is used in the form of the fiber, it may be used in an optimum form for uniformly laminating on the surface of the support. The peelability of such filter material when backwashed is very good and further carbon fiber material has an advantage in that it is superior in abrasion resistance to active carbon and may be used repeatedly without losing shape.

Condensate, supplied water and drain water in a steam system are normally made weakly alkaline by a disoxidant such as hydrazine and ammonia. Consequently, iron and copper components eluted from the metal material exist as a free ion, hydroxide and oxide and may be in the form of a colloid or of very fine particles larger than a colloid in water and inferred as tending to possess a positive electric charge.

The filter of the present invention has on its surface an acidic group having ion exchange capacity and the property of possessing a very high negative surface electric charge (negative zeta potential) in an atmosphere of supplied water. It is believed that the ability of the filter to remove scale-forming substances from water arises from a combination of the size of mesh of the filter material and the ion exchange property of the acidic groups.

This point is inferred also from the fact that a filter according to the present invention having a larger pore diameter than a millipore filter having a pore diameter of 0.45 μ is a more efficient filter than the millipore filter. In one example, the latter had a removing ratio of 50% when the former showed a removing ratio of 85%. The carbon fibers must have acidic groups in order to lower this surface electric potential of the fibers. The acidic group may be, for example, a sulphonic acid group, phosphoric acid group, carboxyl group or phenolic hydroxyl group, directly bonded to the carbon fiber proper. An acidic group bonded to the fiber by a group which will decompose, for example an ester, ether, urea, urethane or amide group, cannot be used because the acidic group may become detached from the fiber. Because of the risk of acidic groups becoming detached from the fiber, it is preferable to use a carboxyl or phenolic hydroxyl group as the acidic group, rather than a sulfonic acid group or phosphoric acid group which would form strong acid radicals in solution if they became detached. A sulfonic acid group may be introduced onto the carbon or graphite fiber by, for example, treating the fiber with fuming sulfuric acid, concentrated sulfuric acid or a sulfonating reagent such as chlorosulfonic acid. A phosphoric acid group may be introduced onto the fiber by, for example, treating the fiber with phosphorus trichloride in the presence of anhydrous aluminium chloride. A carboxyl group or a phenolic hydroxyl group may be introduced onto the fiber by, for example, treating the fiber in a preferably heated aqueous solution with an oxidizing agent such as permanganate, chromate, hydrochlorite, persulfate, bromate ion, chlorine, dilute nitric acid, concentrated nitric acid or sulfuric acid, or by adhering these substances to the fiber and heat-treating the resulting mixtures. In the case of a fiber obtained from an acrylic fiber, it is possible to hydrolyze the remaining nitrile group using a mineral acid such as sulfuric acid, hydrochloric acid or nitric acid or an alkali metal hydroxide to introduce a relatively large number of carboxyl groups. With a fiber obtained from phenolformalic condensate by sintering at a temperature not exceeding 700°-800° C, it is possible to use directly the remaining phenolic hydroxyl groups.

The amount of acidic groups on the fibers can be estimated by the following method. The fibers are washed with an excess of hydrochloric acid, thereafter washed with pure water until no chlorine ion is detected and then dried. 2-5 g of the dried fiber is precisely weighed (W g) and then immersed in 500 ml of an aqueous solution of 0.01 N caustic soda for at least 100 hours with occassional stirring. Thereafter, 100 ml of the supernatant liquid is taken and neutralized by titration with an aqueous solution of 0.01 N hydrochloric acid (amount of hydrochloric acid consumed is made $x$ ml). The amount of the acidic group may be obtained from the following equation:

$$\text{Acidic group amount (meq/g)} = \frac{0.01 \times 500 \times (\frac{100 - x}{100})}{W}$$

In the present invention, if many of the scale-forming substances in supplied water are colloids and granules, a filter having a relatively low concentration of acidic groups will serve to remove the scale-forming substances. On the other hand, if the major components of the scale-forming substance are present as ions, it is necessary to use a filter having a greater concentration of acidic groups. In the former case, it is preferred that the concentration of acidic groups is at least 0.01 meq/g and in the latter case it is preferred that the concentration of acidic groups is at least 0.05 meq/g. There is no particular upper limit on the concentration of acidic groups.

If the fiber is subjected to a test in which it is required to withstand hot water at 200° C for 1 month, it is found that when the carbon content of the fiber is low a large amount of carbon is eluted in the water. If the carbon content is at least 85% by weight, the performance of the fiber is satisfactory, although it is preferred to use a fiber whose carbon content is at least 90% by weight. Measuring of the carbon content may be easily carried out using a CHN corder (MT-2 carbon, hydrogen, nitrogen automatic analyzing apparatus manufactured by Yanagimoto Seisakusho).

Within the range without departing from the effect of the present invention, a carbonaceous fiber obtained by introducing a hydroxyl group other than a phenolic hydroxyl group may be used for the purpose of reducing the surface electric potential of the fiber.

In the present invention, a fiber satisfying the aforesaid specified values made into staple fiber which is dispersible in water is laminated on the surface of a porous support, or it is used on a so-called pre-coating type filter form. If the fiber is too long, it inter-twines excessively, dispersibility is poor and the laminated surface tends to become non-uniform. On the other hand, if the fiber is too short, the fiber invades the support or an issue loss at the time of back wash increases. Therefore, the preferred range for the fiber length is from 0.1 to 5 mm, more preferably from 0.5 to 2 mm. As regards the fiber diameter, when it is too large, the intervals become larger and the percentage of the scale-forming substances removed is lowered. On the other hand, if it is too little, the pressure difference rises. Therefore, the preferred diameter is within the range of from 1 to 50 μ, more preferably 1 to 20 μ. If the amount of fiber used is large, the percentage of scale-forming substance removed is naturally increased. However, the pressure difference tends to become large. The amount of fiber to be used depends upon the particular conditions, but generally it is preferably to use from 100 to 5000 g/m².

As a support, a porous material composed of a known material such as stainless and anti-corrosive metal, porcelain, glass or carbon can be used, of which a stainless sintered metal or a carbon material are preferred. The pore diameter of the support should be sufficiently small so that there is no danger of allowing fibers to pass through the pores but is should be large enough to cause only a small pressure difference. Generally, a diameter within the range of from 5 to 200 μ is preferred. In shape the support may be, for example, a coil, porous filter cylinder or lobe.

The filter may be anywhere in the condensate pipe, supplied water pipe or drain pipe of a steam can system. However, the place is preferably one where the temperature of water reaches at least 80° C, and most preferably after all or a greater part of the drain water has been recovered in a primary condensate pipe or supplied water pipe, for example, a place subsequent to the exit of a degasifier. And said filter may be provided in a pipe recovering drain containing a large amount of iron content.

BRIEF DESCRIPTION OF THE DRAWINGS

The invention will be further illustrated with reference to the accompanying drawings illustrating the properties and use of a filter of the invention, in which.

DESCRIPTION OF THE PREFERRED EMBODIMENTS

Figure 1:
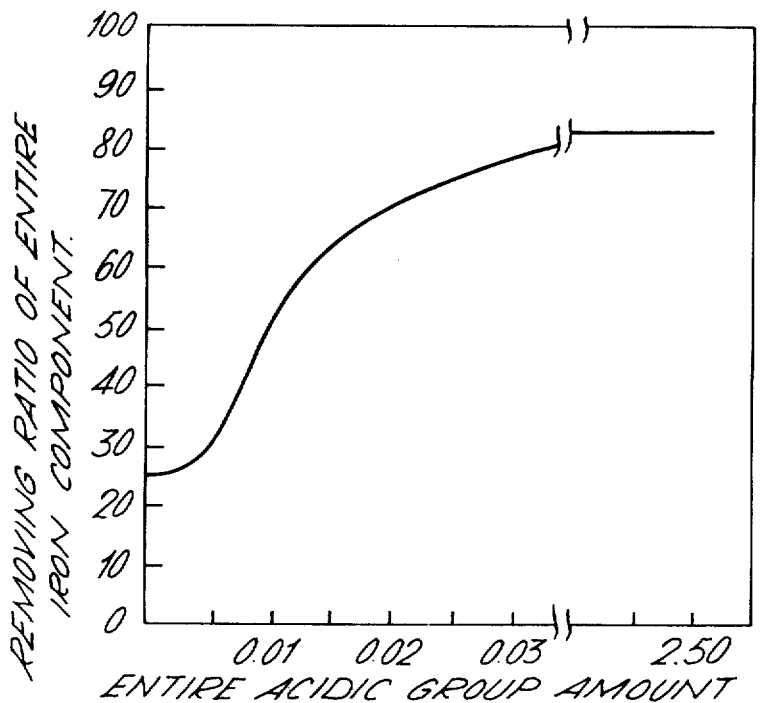
FIG. 1 is a graph showing the relation between the amount of acidic groups in a carbonaceous fiber used in the present invention and the removing ratio of the entire iron content.

FIG. 1 shows the relation between the percentage of the iron component removed and the amount of acidic groups on the carbonaceous fiber of the filter. The filter comprises a carbonaceous fiber (carbon content 92-93%) having a diameter of 7 $\mu$ and a cut length of 2.0 mm obtained by sintering an acrylic fiber at a density of 1000 g/m$^2$ on the surface of a cylindrical stainless sintered metal filter. Water was supplied at a rate of 4 T/m$^2$.hr in a supplied water system (average temperature 190° C, pH 9-9.7, normally containing 10-15 ppb of iron) of a steam power plant using an ultra-critical pressure steam can. As can be seen from FIG. 1, as the amount of the acidic groups on the carbonaceous fiber increased, the percentage of iron removed increased. This effect was observed until the amount of iron removed reached about 80%, when there occurred a levelling off in the graph. Thus, the effect of the acidic groups is demonstrated.

Figure 2:
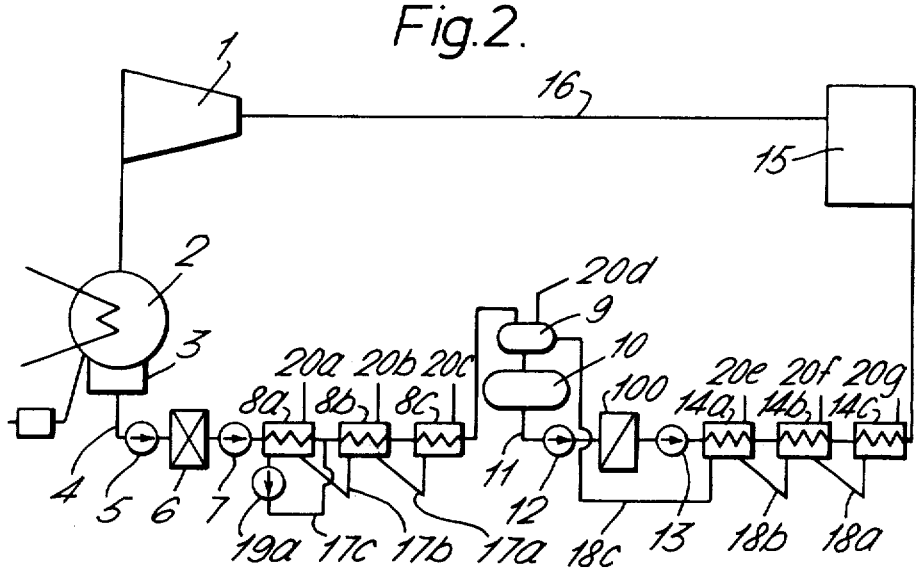
FIGS. 2 and 5 are flow sheets of Examples 1 to 4, respectively wherein the present invention is applied to a steam generator in a steam power plant.

FIG. 2 shows an arrangement in which the filter of the present invention is used in an ultra-critical pressure steam generating plant or a sub-critical breakthrough type steam generating plant. In FIG. 2, steam from a turbine 1 condenses in a condenser 2, is stored in a condenser hot well 3 and forwarded by a condensate pipe 4 and a condensate pump 5 to a condensate demineralizing device 6 where it is freed of scale-forming substances such as salt, iron and copper components. The condensate is further passed along pipe 4 by a condensate pressure raising pump 7, being heated in low pressure supplied water heaters 8a, 8b, 8c. The water enters a degasifier 9 where it is heated by steam entering from a bleed pipe 20d and degasified until the oxygen concentration becomes less than 7 ppb. The water joins with the drain of the steam entering from the blend pipe 20d and is stored in a degasified water storer 10. Steam for heating enters the trunk sides of the low pressure supplied water heaters 8a, 8b, 8c from bleed pipes 20a, 20b, 20c, passes through drain pipes of low pressure supplied water heaters 17a, 17b, 17c, is forwarded to a low pressure drain pump 19a and enters the condensate pipe 4. Steam for heating entering the trunk sides of high pressure supplied water heaters 14a, 14b, 14c from bleed pipes 20e, 20f 20g is drained and enters the degasifier 9 via drain pipes of high pressure supplied water heaters 18a, 18b, 18c to join the condensate. Supplied water from the degasified water storer 10 is passed via a supplied water pipe 11 to a filter 100 by means of a supplied water booster 12. The water is passed to high pressure supplied water heaters by means of a supplied water pump 13 where it is heated and then enters a steam generator 15 via the supplied water pipe 11. Here the water is converted to steam and enters the turbine 1 via a steam pipe 16. In the example shown in FIG. 2, the water temperature in the condenser hot well 3 is in the range of from 10° to 40° C, although the temperature varies by condition of location and season. The temperature in the degasified water storer 10 is generally in the range of from 120° to 175° C, though this varies depending upon the load of the plant. The temperature at the entrance of the steam generator 15 is in the range of from 200° to 290° C. The temperature at the exit of the low pressure drain pump 19a is in the range of from 50° to 85° C. The temperature in the high pressure drain pipe 18c is in the range of from 125° to 185° C.

A greater part of the scale-forming substances in the water of such a high-pressure steam generating plant is iron. The concentration of iron during operating at the exit of the condensate demineralizing device 6 is generally low, for example 2 to 3 ppb. However, it increases at the exit of the degasifier 9 to 5 to 15 ppb, which is about the same value as at the entrance of the boiler. The reason why the iron content increases as far as the degasified water storer 10 is because iron elutes chemically and physically from steel materials of the condensate pipe, the condensate side and steam drain side of the low pressure supplied water heaters, the degasifier and steam drain side of the high pressure supplied water heaters. The iron content in the drain of the high pressure supplied water heaters is especially high. For these reasons, it is preferable to fit a filter of the invention in filter device 100 after the degasified water storer 10 where all the condensate and drains join and increase of the iron content is almost completed. More specifically, as shown in FIG. 2, it is preferred to provide the filter device 100 on the passage of the supplied water pipe 11 connecting the supplied water booster pump 12 and the supplied water pump 13. It is a matter of course that the filter device 100 shown in FIG. 2 could be provided on the way of the supplied water pipe 11 close to the boiler 15 on the higher temperature side.

Figure 3:
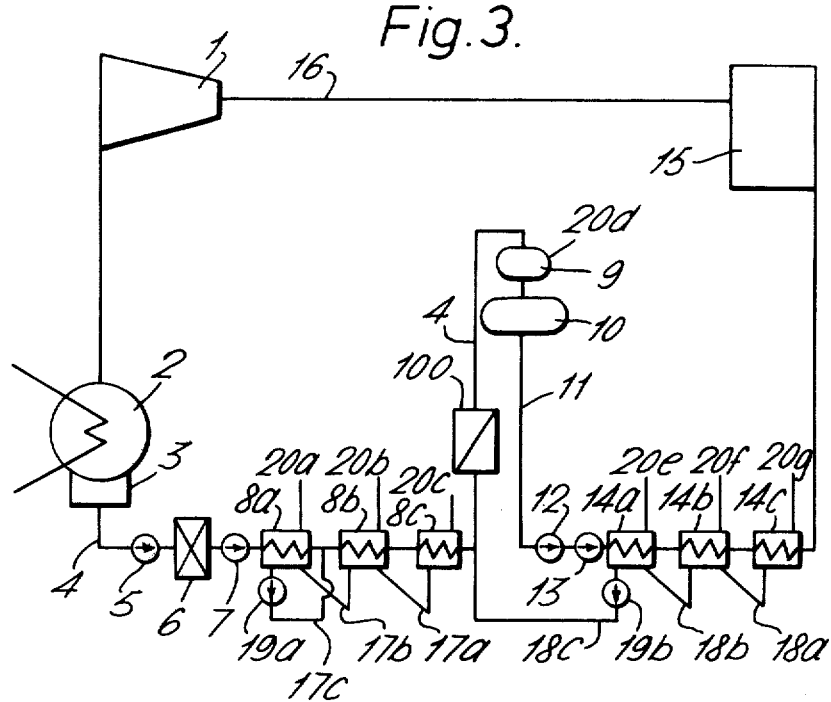

FIG. 3 illustrates the provision of the filter device 100 in the condensate pipe 4 connecting the low pressure supplied water heater 8c and the degasifier 9 in a steam generating plant similar to that of FIG. 2. The numbers 1-20g in FIG. 3 identify the same items as numbers 1-20g in FIG. 2. 19b in FIG. 3 shows a high pressure drain pump. In FIG. 3, it is preferred to have the drain pipe 18c from the steam drain side of the high pressure supplied water heater 14a to the degasified 9 as shown in FIG. 3 reach the condensate pipe 4 on the entrance side of the filter 100. The reason for this is to filter also the high pressure supplied water heater drain, which has a high concentration of iron as mentioned above. The arrangement of FIG. 3 is somewhat less efficient than the arrangement of FIG. 2. It is also possible to provide the filter 100 in the condensate pipe 4 on the lower temperature side than the place shown in FIG. 3. However, as the filter is moved to the lower temperature side, the effectiveness of the removal of scale-forming substances by the filter is gradually reduced.

Figure 4:
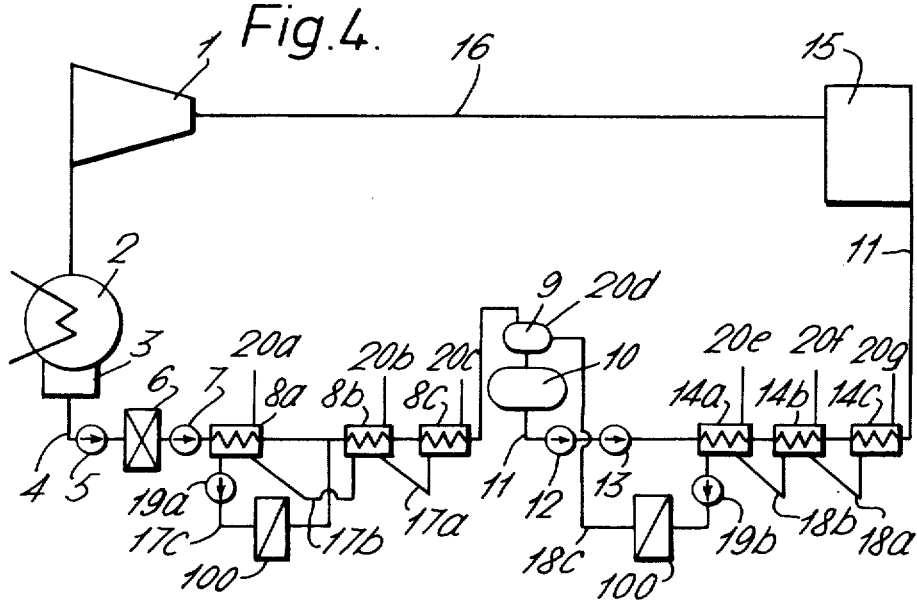

FIG. 4 illustrates the provision of filters 100 in the steam drain pipes 17c and 18c in a steam generating plant the same as those in FIG. 2 and FIG. 3.

In FIG. 4, the numbers 1-20g identify the same items as the numbers 1-20g in FIG. 2. In this arrangement, the drain of the high pressure supplied water heaters and the drain of the low pressure supplied water heaters, both having high concentrations of iron, are selectively filtered to remove the iron. Accordingly, this arrangement is advantageous when the drains contain large amounts of scale-forming substances. Iron eluted from the condensate pipe, condensate side of the low pressure supplied water heaters 8a, 8b, 8c, degasifier 9 and degasified water storer 10 is not removed. Therefore, the effectiveness is decreasing the iron content in the supplied water is somwhat lower than in the arrangements of FIG. 2 and FIG. 3. However, there is an advantage in that a small filter 100 will suffice because the amount of water treated is small.

In a drum-type steam generating plant of a steam power plant for industrial use or in a steam power plant for home consumption, providing the filter at the positions shown in FIGS. 2 to 4 does not depart from the applicable range of the present invention. The filter (device) in the process of the present invention may be provided before the condensate demineralizing device in FIG. 4 the same as the conventional filter device used at a low temperature.

As explained above in detail, according to the process of the present invention, scale-forming substances contained in high temperature supplied water may be removed at a high removing ratio and it is possible to reduce the frequency of chemical washing such as washing with an acid which has heretofore been carried out frequently. Particularly because the filter of the present invention is stable to very hot water, the filter is particularly useful for removing scale-forming substances from high temperature supplied water of especially an ultra-critical pressure or subcritical pressure steam generating plant. In the treatment of the condensate, supplied water and the drain of a steam generating plant for other power plants for industrial use, as the heat source of an ordinary plant and for generation of electric power for home consumption, the filter may be used at a place where the water temperature is higher than in the conventional process. The present filter has broad uses such as for treating radio-active waste water from the primary cooling water and secondary cooling water and for treating supplied water to a steam generator of a light water furnace and a high breeder in an atomic power plant, and for removing colloids and particles from high temperature water of various kinds.

The invention is further illustrated in the following examples. In the examples, measuring of the concentration of the acidic groups was carried out by the aforesaid method and measuring of the carbon content was carried out using a CHN corder (MT-2, manufactured by Yanagimoto Seisakucho).

Firstly, the manufacture of carbon or graphite fiber for the filter will be described. Acrylic fiber, asphalt fiber (treated in air containing ozone at 60° C for 5 hours in advance), phenol formalic fiber or polyvinyl alcohol fiber were used. The materials were, according to a known method, heated in air by elevating the temperature from 150° C to 300° C over a period of time and then carbonized in a nitrogen stream by varying the carbonizing conditions within the range of from 300° C to a maximum of 2500° C to produce various different carbonaceous fibers. The obtained carbonaceous fibers were treated by one of the following methods to introduce acidic groups thereinto.
Namely:

Method 1: Treated in an aqueous solution of 20 g/liter sodium hydroxide at 100° C for 2 hours.

Method 2: Treated in an aqueous solution of 200 g/liter sodium hydroxide at 100° C for 2 hours.

Method 3: Immersed in 60% nitric acid at 90° C for 2.4 hours.

Method 4: Immersed in an aqueous solution containing 20% of potassium permanganate and 50% of nitric acid at 105° C for 40 minutes.

Method 5: Heated with 98% sulfuric acid in an autoclave at 180° C for 2 days.

The conditions of forming the carbonaceous fibers and the characteristics of the carbonaceous fibers are shown in Table 1.

Next, an explanation will be made with reference to the removability of scale-forming substances from high temperature supplied water and hot water resistance. Use was made of an ultra-critical pressure steam generating plant as shown in FIG. 2 except that the turbine was replaced by a reduced pressure, reduced temperature apparatus. A pre-coating type filter device whose support was a stainless sintered metal cylinder having an average pore diameter of 100 $\mu$ (inner diameter 50 mm, outer diameter 60mm, length 100 mm) was provided on a pipe between the supplied water booster pump 12 and the supplied water pump 13 and supplied water was caused to pass this filter device. On the outer surface of this support, a carbonaceous fiber having an average length of 2 mm and a thickness of 7 $\mu$ obtained in this specific example was laminated at a ratioof 1500 g/m, the water passing speed of filtration was 5 T/m$^2$.hr and the temperature of supplied water was 160°-180° C. The supplied water to be filtered was obtained by adding ammonia and hydrazine to pure water having a specific conductivity of less than 0.2$\mu$U/cm$^2$ and controlled to pH 9-9.7 and said supplied water contained about 10 ppb of the entire iron content. The supplied water at the entrance and the exit of the filter device 100 was sampled, hydrochloric acid containing no iron was added to these two samples and the two samples were heated sufficiently to dissolve the respective entire iron content. Thereafter, the respective entire iron contents were measured by the 4.7 diphenyl 1.10 phenanthroline method (Japanese Industrial Standard B-8224), from which the iron removing ratio was calculated and made an index for the removability of scale-forming substances. When this filter test was continued for 3 weeks, the iron removing ratio was 75-90%, an average 82%. When this used carbonaceous fiber filter material was recovered and reclaimed by washing with hydrochloric acid and with water and offered for the same filter test again, about the same iron removing ratio was obtained. When the filter device of the present invention was transferred and provided at three places, i.e. the supplied water pipe 11 (supplied water temperature 180°-220° C) connecting the high pressure supplied water heaters 14a to 14b, the drain pipe 18c (drain temperature 170°-190° C) and the condensate pipe 4 (condensate temperature 120°-160° C) connecting the low pressure supplied water heater 8c to the degasified 9 in the same ultra-critical pressure steam generating plant for test to carry out filter tests, average iron removing ratios of 84%, 87% and 76% were obtained, respectively.

Next, an explanation will be made with reference to a hot water resistance test. Various carbonaceous fibers washed with water, dried and precisely weighed in advance were put in separate stainless sintered metal containers, respectively, inserted in the pipe at the exit of the high pressure supplied water heater 14a (supplied water temperature 180°-220° C) and exposed to supplied water for 3 months, thereafter, said fibers were recovered, washed with hydrochloric acid containing no iron, washed with water, dried and precisely weighed, compared with the pre-exposed weights and the hot water resistances were sought from the weight decreasing ratios of these fibers. The practical permissible limit of this weight decreasing ratio is inferred as 0.5%, and in this hot water resistance test, a carbonaceous fiber containing at least about 90% of carbon was less than 0.03% in weight decreasing ratio, a carbonaceous fiber containing 85-90% of carbon was 0.03 to 0.46% in weight decreasing ratio. However, a carbonaceous fiber containing less than 85% of carbon exceeded 0.5% in weight decreasing ratio.

ness 12 $\mu$) produced according to the method No. 4 of this specific example was pre-coated at a ratio of 3 kg/cm$^2$ and supplied water was caused to pass therethrough at a filtering speed of 4 T/m$^2$·hr. The water supply conditions at this position varied depending upon the load of the evaporator, the temperature was 110°-150° C, pH was 8.3-9.0 and as scale-forming substances 50 ppb of the entire iron content consisting of iron oxide and iron hydroxide and the entire copper content were contained. By applying the process of the present invention, the iron content decreased to average 6 ppb and the copper content decreased too, and this effect could be retained for about 2 weeks.

As has been emphasized previously in this application, the fiber diameter or thickness is critical and should not be lower than 1 $\mu$. When fibers having a thickness below 1 $\mu$ are used, the diameter of the holes

TABLE 1

| Sample No. | Producing Conditions | | | Properties | | | | Estimated Results | |
|---|---|---|---|---|---|---|---|---|---|
| | Material fiber | Maximum carbonizing temperature (° C) | Method of introducing an acidic group | Acidic group content (meq/g) | Carbon content (%) | Average fiber diameter ($\mu$) | Fiber length (mm) | Iron removing ratio (%) | Weight decreasing ratio (%) |
| 1 | Acryl fiber | 2500 | — | 0.0028 | 99.1 | 6 | 3 | 31.2 | 0.00 |
| 2 | " | " | Method 1 | 0.018 | 98.7 | 6 | " | 70 | 0.00 |
| 3 | " | 1000 | " | 0.028 | 92.0 | 7 | " | 75 | 0.00 |
| 4 | " | " | Method 2 | 0.067 | 91.6 | 7 | " | 80 | 0.01 |
| 5 | " | " | Method 3 | 0.780 | 90.5 | 31 | " | 85 | 0.02 |
| 6 | " | " | Method 4 | 0.140 | 91.7 | 7 | " | 73 | 0.03 |
| 7 | " | 700 | Method 2 | 2.560 | 86.5 | 8 | " | 85 | 0.36 |
| 8 | " | 300 | — | 0.0042 | 78.6 | 11 | " | — | 56.8 |
| 9 | Rayon | 1000 | Method 3 | 0.480 | 92.0 | 3 | " | 88 | 0.02 |
| 10 | Asphalt fiber | 2000 | Method 5 | 1.48 | 98.6 | 8 | " | 85 | 0.01 |
| 11 | Phenol formalin fiber | 350 | — | 1.490 | 85.7 | 19 | " | 66.5 | 0.01 |
| 12 | Polyvinyl alcohol fiber | 1000 | Method 4 | 0.500 | 93.2 | 8 | " | 81 | 0.09 |

Tests were carried out with fibers whose lengths were 5 mm, 1 mm and 0.1 mm. In the case of a 5 mm long fiber, pre-coating was not impossible, but some unevenness occurred and a fiber having a length greater than 5 mm was considered impractical. A 1 mm long fiber was good in pre-coating property and increaase in the pressure difference was less than 0.2 kg/cm$^2$. In contrast thereto, a 0.1 mm long fiber caused a large increase in the pressure difference when the pre-coating amount was large.

Figure 5:
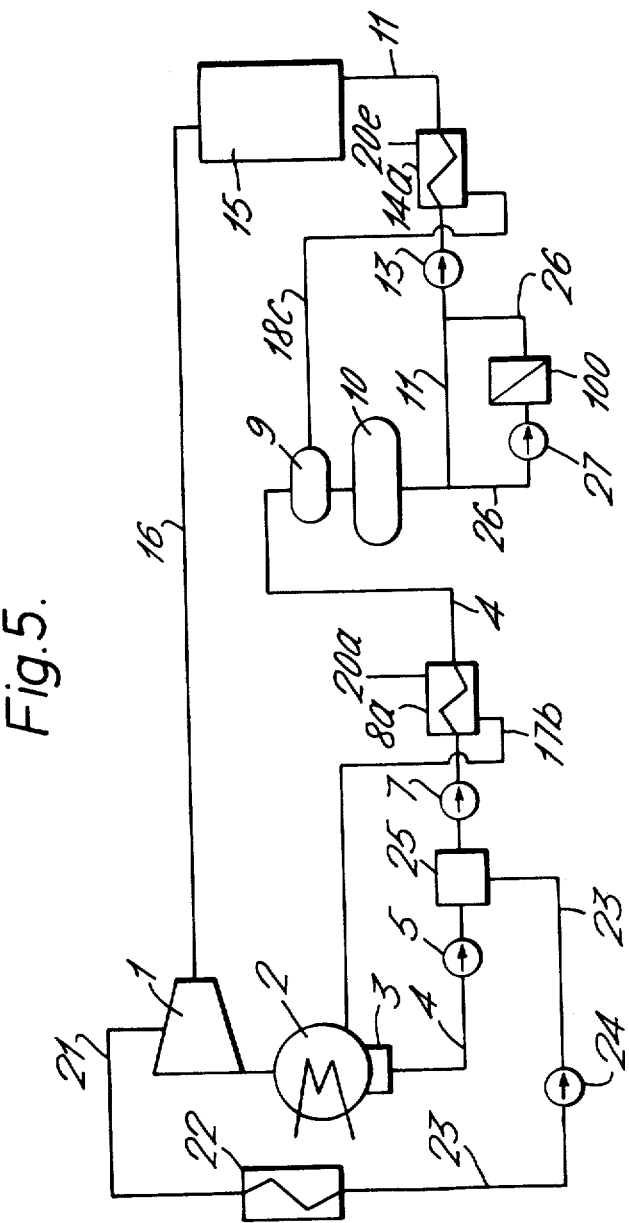

FIG. 5 shows a flow sheet of a steam generating plant used for generation of electric power for home consumption and for steam for a private factory. Numbers 1-20e in FIG. 5 correspond to numbers 1-20e in FIG. 2 so explanation for these items is omitted. 17b In FIG. 5 shows a drain pipe of a low pressure supplied water heater. In FIG. 5, 21 is a bleed pipe from the turbine 1 to a plant heat exchanger 22 and 23 is a plant drain pipe introducing drain water from the plant heat exchanger 22 to a condensate recovering tank 25 and having a plant drain pump 24 on the way. The condensate recovering tank 25 is provided in the condensate pipe 4 connecting the condensate pump 5 and the condensate pressure raising pump 7. In the supplied water pipe 11 connecting the degasified water storer 10 and the supplied water pump 13, a bypass pipe 26 and a bypasss pump 27 are provided. On the bypass pipe 26 at the exit of the bypass pump 27, the filter device 100 according to the present invention is provided. The filter device 100 is a pre-coating type filter device containing a carbon porous cylindrical support having an average pore diameter of 70 $\mu$ (outer diameter 70 mm, inner diameter 40 mm, length 1000 mm), on which as a filter material a carbonaceous fiber (average fiber length 0.5 mm, thickof the filter become excessively small and the differential through the filter is too large. On the other hand, fibers having diameters above 1 $\mu$ are effective in filtering colloidal particles such as iron materials having particle sizes below 1/10 of the diameter of the holes in the filter to an efficiency of at least about 80%. Thus, the thickness of the carbon fibers need not be too small, i.e. lower than 1 $\mu$ which means that the pressure drop across the filter is held at a minimum without sacrificing the filtering capacity. Further, the efficiency of the filter of the present invention depends more upon the colloidal adsorbing properties of the carbon fibers than on ion exchange characteristics thereof. These points are illustrated in the following test.

With the exit of a degasified water storer 10 of an electric power plant having a subcritical once through boiler having the same system as in FIG. 2 of this application (except for filter 100), was connected a small filter for a test according to the present invention and a filter test was carried out.

The carbonaceous fibers employed has been subjected to a calcining (sintering) temperature of 1000° C, had a carbon content of 91% by weight and the process for introducing acidic groups was the same as described in the specification, page 17, Method 2, acidic group content of the fibers were 0.6 meq/g., the thickness 8 $\mu$, and the average length 1 mm. The filter used was a pre-coated type filter including therein a carbon porous cylindrical supporter (having an outer diameter of 70 mm, an inner diameter of 40 mm and a length of 1000 mm). The temperature of the supplied water at the entrance of the filter was 165° C ± 5° C, the pH was 94

± 0.1, the amount of dissolved oxygen was 1-3 ppb (parts per billion parts of water by weight), the concentration of the total iron content ranged from the minimum 13 ppb to the maximum 20 ppb, the average being about 17 ppb. When the filter test was carried out under these conditions for 2 months, the filtered efficiency was about 90% on the average in the first month and about 80% in the second month. During this period, the differential pressure through the filter was 0.3 kg/cm$^2$, which was constant and no inclination to increase was observed.

After completion of the test, the entire amount of the carbonaceous fibers was taken out, the iron content adsorbed to the fibers was dissolved with an aqueous solution containing 10% by weight of hydrochloric acid and 2% by weight of fluoric acid, and when the entire iron content was estimated by the EDTA titration method to determine the adhered amount of the iron content per unit weight of the carbonaceous fibers, it was 120 g of Fe/kg of the carbonaceous fibers.

Because the acidic group content (ion exchange capacity) of this fiber was 0.6 meq/gr, the adsorbed amount of the iron content due to an ion exchange action was 14 g of Fe/kg of carbonaceous fibers when iron was in the form of Fe(OH)$_2$ and 9.7 g/kg when iron was in the form of Fe(OH)$_3$. Thus, according to the present invention, there was adsorbed an amount of 120 g/kg, or above 8.6 times the amount of the iron content removable by the ion exchange method of Pall et al. Thus, it is apparent from the above test results that pyrolytic carbon fibers containing cation exchange acid residues not only offer the ion exchange properties described by Ermolenko et al in U.S. Pat. No. 3,702,832, Column 1, line 24-34 but also are capable of efficiently adsorbing colloidal iron content of hot water.

When a small amount of the fibers were taken out at the completion of the filter test and examined under a scanning electron microscope, it was observed that a plurality of particles having particle sizes below 0.5 μ adsorbed to fibers having a thickness of 8 μ. Only a few particles having a particle size about 0.5 μ were observed. Namely, the number of particles having a coarse particle size were very few in number. When a small sample of the filter in which the fibers of the present invention were laminated in a precoated state on a small porous plate were examined under a scanning electron microscope, the greater number of the diameters of holes produced by the intertwinement of the fibers was in the vicinity of a few microns. That is to say, these holes possessed diameters more than 10 times the size of the filtered particles. The filter of the present invention features the use of the above-mentioned carbon fibers which have pores of 1 micron or more in diameter but which efficiently catch iron content measuring less than 1 micron in diameter. It therefore is not necessary to reduce the filter pore size to 1 micron or less as insisted by Pall et al in U.S. Pat. No. 3,252,270. Further, even when a considerable amount of the iron content was filtered, the diameters of the holes of the filter medium layer were only slightly decreased. This means that the filtering operation can proceed with only a slight change in the pressure differential across the filter.

What is claimed is:

1. In a method of removing scale-forming substances from a water supply system for a steam generator which comprises passing hot water through a filter to remove the scale-forming substances, the improvement wherein the hot water is passed through a filter comprising a porous support having a pore diameter in the range of from 5 to 200 μ having laminated thereon carbonaceous fibers, said fibers (a) having a carbon content of at least 85% by weight (b) a length in the range of from 0.1 to 5 mm (c) a diameter in the range of from 1 to 50 μ (d) acidic groups in a concentration of at least 0.01 meq/g on their surface, and (e) being laminated on the said support in an amount from 100 to 5000 g/m$^2$.

2. A method according to claim 1, wherein the hot water passing through the filter exceeds 80° C.

3. A method according to claim 1, wherein the acidic groups are selected from sulphonic acid groups, phosphoric acid groups, carboxyl groups and phenolic hydroxyl groups.

4. A method according to claim 3 wherein the acidic groups are phenolic hydroxyl groups.

5. A method according to claim 4, wherein the carbonaceous fibers having phenolic hydroxyl groups are obtained by carbonizing an acrylic fiber and treating the carbonized fiber with at least one oxidizing agent selected from the group consisting of permanganate, chromate, hydrochloride, persulfate, bromate ion, chlorine, dilute nitric acid, concentrated nitric acid and sulfuric acid.

6. A method according to claim 1, wherein the carbonaceous fibers are obtained by carbonizing a polyacrylonitrile fiber and hydrolyzing the residual nitrile groups to carboxyl groups.

7. A method according to claim 1, wherein the porous support for the filter is stainless steel or carbon.

8. A method according to claim 1, wherein the concentration of acidic groups is at least 0.05 meq/g.

9. A method according to claim 1, wherein the carbonaceous fibers have a diameter in the range of from 1 to 20μ.

* * * * *